United States Patent [19]

Rawlinson et al.

[11] Patent Number: 4,817,048
[45] Date of Patent: Mar. 28, 1989

[54] DIVIDER WITH QUOTIENT DIGIT PREDICTION

[75] Inventors: Stephen J. Rawlinson, Sunnyvale; Quang H. Nguyen, San Jose; R. Morse Wade, Sunnyvale, all of Calif.

[73] Assignee: Amdahl Corporation, Sunnyvale, Calif.

[21] Appl. No.: 895,271

[22] Filed: Aug. 11, 1986

[51] Int. Cl.[4] .............................................. G06F 7/52
[52] U.S. Cl. ..................................... 364/761; 364/763
[58] Field of Search ............................... 364/761–763, 364/767

[56]  References Cited
U.S. PATENT DOCUMENTS

| | | | |
|---|---|---|---|
| 3,234,367 | 2/1966 | Ottaway et al. | 364/761 |
| 3,578,961 | 5/1971 | Miu | 364/763 |
| 3,684,879 | 8/1972 | Koehler | 364/767 |
| 3,736,413 | 5/1973 | Ferguson | 364/761 |
| 4,320,464 | 3/1982 | Desmonds | 364/767 |
| 4,466,077 | 8/1984 | Iannucci et al. | 364/767 |
| 4,603,397 | 7/1986 | Ohtsuki et al. | 364/763 |
| 4,635,220 | 1/1987 | Yabe et al. | 364/763 |

FOREIGN PATENT DOCUMENTS 0114133  7/1983  Japan .................................. 364/762

Primary Examiner—Gary V. Harkcom
Assistant Examiner—Dale M. Shaw
Attorney, Agent, or Firm—Fliesler, Dubb, Meyer & Lovejoy

[57]  ABSTRACT

A divider, which performs division in a base other than 2, that reduces in most cases the number of cycles it takes to generate each quotient digit. This involves predicting the minimum possible quotient digit in response to leading digits of the partial remainder and of the divisor. The predicted minimum possible quotient digit times the divisor is then subtracted from the partial remainder. If the result of the subtraction is less than the divisor, the predicted least possible quotient digit is the correct quotient digit. If the result of the subtraction is greater than the divisor, the divisor is subtracted iteratively from that result until the partial remainder falls below the value of the divisor. For each subtraction, the predicted quotient digit is incremented by one, so that a correct quotient digit results at the end of the iteration.

25 Claims, 4 Drawing Sheets

DIVIDER WITH QUOTIENT DIGIT PREDICTION

FIELD OF THE INVENTION

The present invention relates to division of operands in an arithmetic unit of a data processing machine. Particularly, the present invention relates to decimal division or division in bases other than two.

BACKGROUND OF THE INVENTION

Classic systems for performing division in data processing machines receive a dividend that is m digits wide and a divisor that is n digits wide, where n is smaller than m, and iteratively generate m−n quotient digits and a remainder that is n digits wide. The first quotient digit is generated by taking the first n digits of the dividend as a partial remainder. The divisor is subtracted from the partial remainder once each cycle until a negative result is reached. The number of subtractions of the divisor from the partial remainder necessary to generate a negative result less one is the first quotient digit. The value of the partial remainder prior to the last subtraction is saved for the generation of the next quotient digit.

The initial partial remainder for the next quotient digit takes the value of the prior partial remainder before the last subtraction concatenated with the next digit from the dividend. Again, the divisor is iteratively subtracted from the partial remainder until a negative result is reached. The process continues until m−n quotient digits are generated. The value of the partial remainder prior to the last subtraction during the generation of the last quotient digit is saved as the remainder.

As can be seen, the larger the quotient digit generated, the more cycles it takes to generate it.

The prior art is exemplified by decimal division on IBM/370-compatible computers. Operands for IBM/370-compatible decimal instructions consist of up to 16 bytes of data (except that one of the operands for multiply and divide cannot have more than 8 bytes) in the packed format. Each byte contains two decimal digits except for the rightmost byte, which contains a decimal digit on the left and a sign code on the right. Each decimal digit and sign code uses 4 bits. Table 1 illustrates how the binary digit and sign codes are interpreted. Operands with invalid digit or sign codes cause execution of the decimal instructions to be terminated.

TABLE 1

| | Interpretation of Digit and Sign Codes | |
|---|---|---|
| | Interpretation | |
| Code | Digit | Sign |
| 0000 | 0 | Invalid |
| 0001 | 1 | Invalid |
| 0010 | 2 | Invalid |
| 0011 | 3 | Invalid |
| 0100 | 4 | Invalid |
| 0101 | 5 | Invalid |
| 0110 | 6 | Invalid |
| 0111 | 7 | Invalid |
| 1000 | 8 | Invalid |
| 1001 | 9 | Invalid |
| 1010 | Invalid | Plus |
| 1011 | Invalid | Minus |
| 1100 | Invalid | Plus (preferred) |
| 1101 | Invalid | Minus (preferred) |
| 1110 | Invalid | Plus |
| 1111 | Invalid | Plus |

Decimal instructions on IBM/370-compatible computers have two operands. Both operands participate in the decimal operation, and the result replaces the first operand. For decimal divide, the first operand is the dividend, and the second operand is the divisor. The divisor cannot be longer than 8 bytes, and it must be shorter than the dividend.

The result of decimal division consists of a quotient placed leftmost in the first operand area and a remainder placed rightmost in the operand area. The remainder is the same length as the divisor, and the quotient length is the difference between the dividend length and the divisor length. The sign of the quotient is determined by the rules of algebra from the dividend and divisor signs. The sign of the remainder has the same value as the dividend sign. These rules hold even when the remainder or quotient is zero. Both the remainder and quotient receive preferred sign codes, but the dividend and divisor each may have any valid sign code. If the divisor is longer than 8 bytes or if the divisor is not shorter than the dividend or if the divisor is zero or if the quotient is too large to be represented in the area allotted for the quotient, then execution of the divide instruction is suppressed or terminated.

In IBM/370-compatible machines, the classic algorithm described above is implemented. Because of the large number of cycles it takes to iteratively determine each quotient digit, decimal division is a relatively long operation leading to bottlenecks in the execution of instructions. Accordingly, there is a need for improved divider algorithms and hardware that reduce the number of cycles required to perform decimal division.

SUMMARY OF THE INVENTION

The present invention improves performance of a decimal divider or for any divider which performs division in a base other than 2, by reducing in most cases the number of cycles it takes to generate each quotient digit. The improvement involves predicting the minimum possible quotient digit in response to leading digits of the partial remainder and of the divisor. The predicted minimum possible quotient digit times the divisor is then subtracted from the partial remainder. If the result of the subtraction is less than the divisor, the quotient digit is the predicted least possible quotient digit. If the result of the subtraction is greater than the divisor, the divisor is subtracted iteratively from that result until the partial remainder falls below the value of the divisor. For each subtraction, the predicted quotient digit is incremented by one, so that a correct quotient digit results at the end of the iteration.

The present invention provides, in a data processing machine for performing division in a base greater than 2 of a dividend having W digits by a divisor having X digits to generate a quotient having Y digits, an apparatus for generating the quotient digits $Q_i$, i=1 to Y. The apparatus comprises a first means for generating a plurality of multiples of divisor. A second means is included for generating an initial partial remainder $PR_i$ for the generation of a quotient digit $Q_i$. A means, responsive to one or more leading digits of the divisor and one or more leading digits of the partial remainder $PR_i$, provides a prediction of the minimum possible quotient digit for $Q_i$. Responsive to the predicted quotient digit, a first multiple from the plurality of multiples of the divisor that is closest to without exceeding the predicted quotient digit times the divisor is selected. A first means for subtracting the selected first multiple of the divisor from the partial remainder $PR_i$ to update the partial remainder $PR_i$ is included. The updated partial remainder is compared to the divisor in a means for determining whether the updated partial remainder $PR_i$ is less than the divisor. A quotient digit incrementing means and a means for storing the quotient digit are included that are enabled in response to the determination of whether the updated partial remainder $PR_i$ is less than the divisor.

The quotient digit incrementing means is responsive to a determination that the partial remainder $PR_i$ is not less than the divisor to enable means for subtracting 1 times the divisor from the updated partial remainder $PR_i$ to further update the partial remainder $PR_i$, means for incrementing the predicted quotient digit for $Q_i$ and for returning the updated partial remainder $PR_i$ to the means for determining.

The means for storing the predicted quotient digit as $Q_i$ is responsive to a determination that the updated partial remainder $PR_i$ is less than the divisor.

After the quotient digit $Q_i$ is determined, the apparatus goes on to calculate the balance of the quotient digits.

In one aspect of the invention, the means for predicting the minimum possible quotient digit is implemented with a table lookup mechanism that is responsive to the leading digit of the divisor and the two leading digits of the partial remainder.

DETAILED DESCRIPTION OF THE INVENTION

Figure 1:
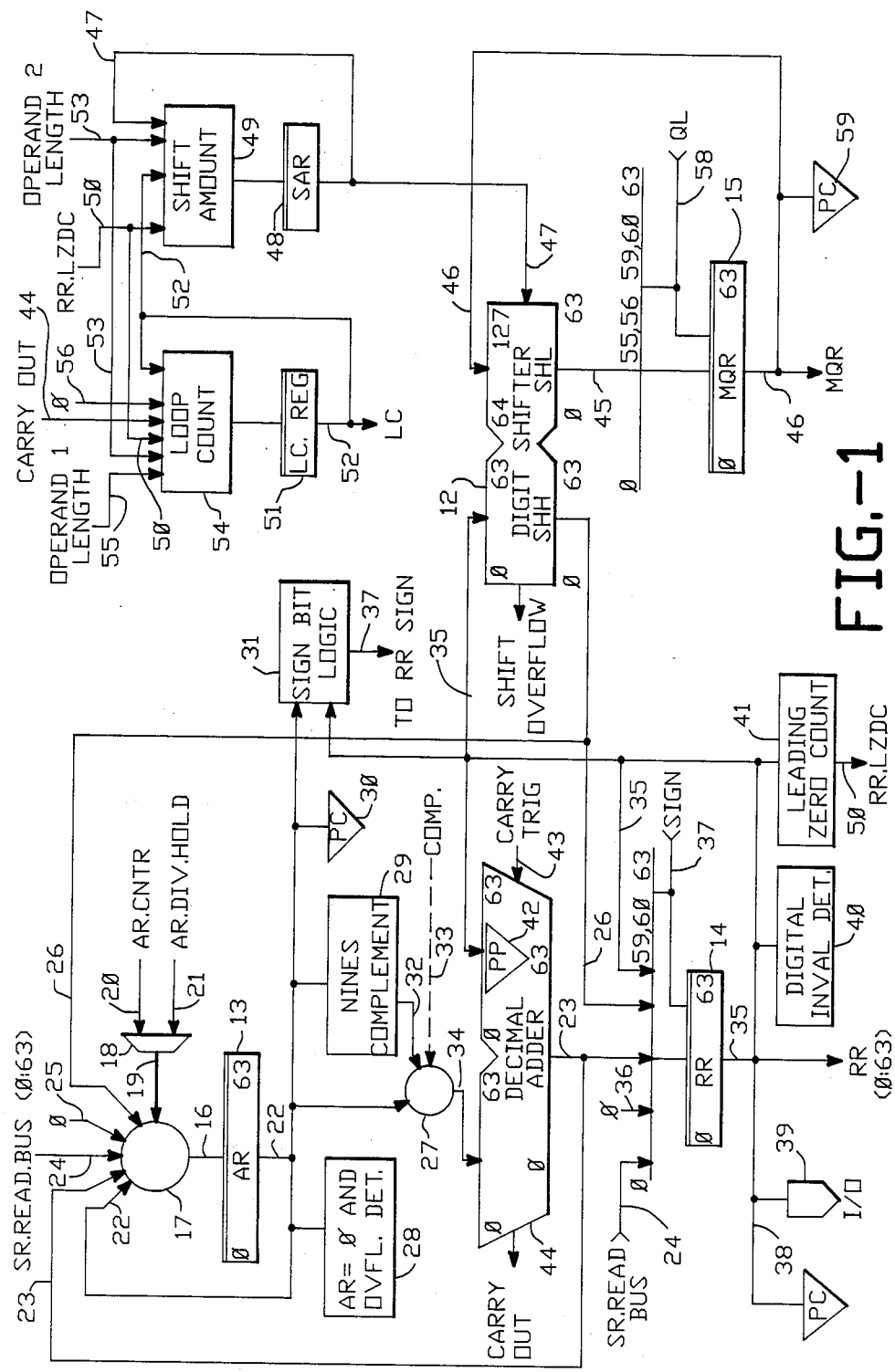
FIG. 1 illustrates a decimal arithmetic unit used in the execution of the present invention.
Figure 2:
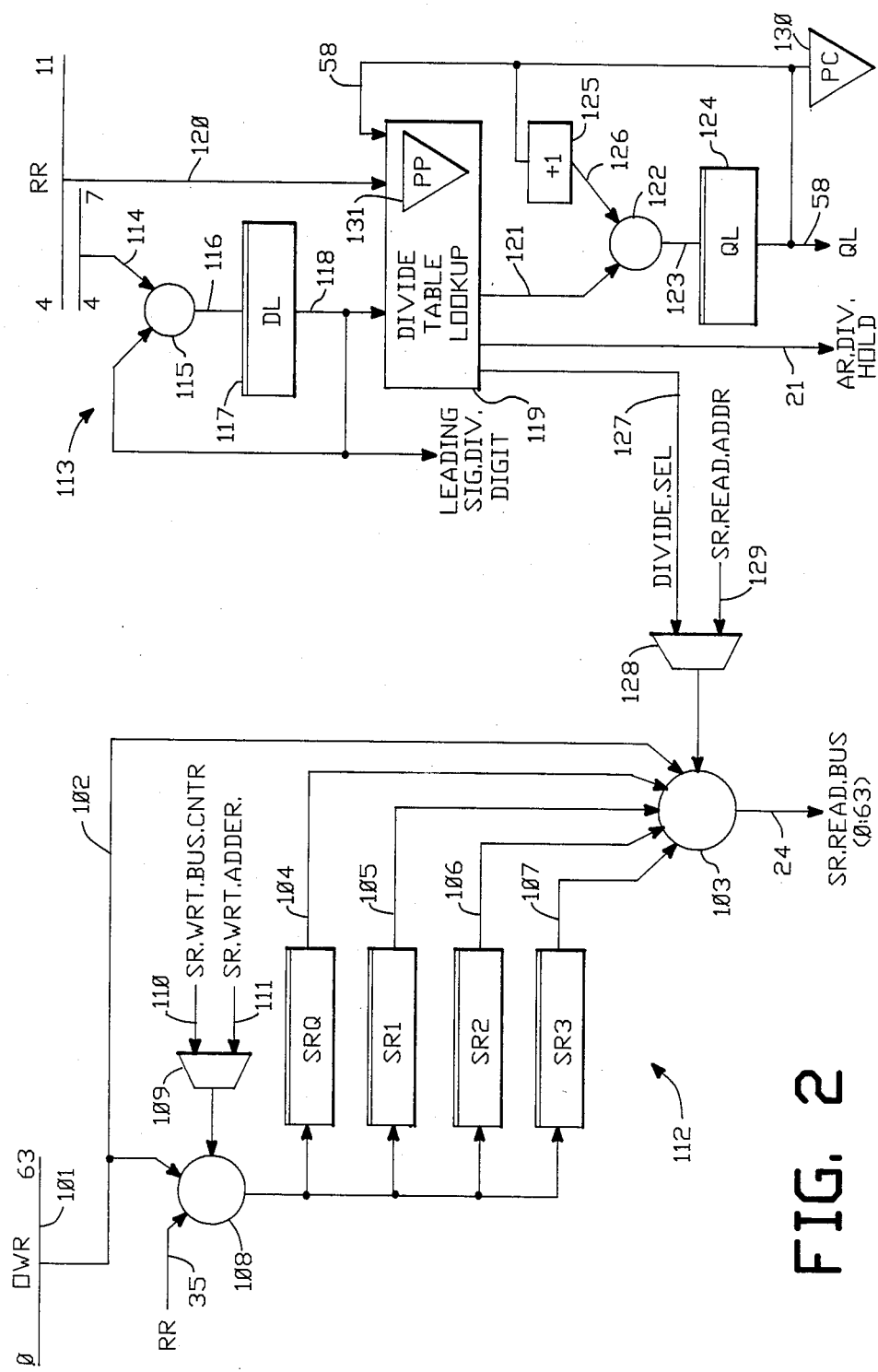
FIG. 2 illustrates a preferred implementation of the means for predicting a minimum possible quotient digit and for generating multiples of the divisor.

With reference to the figures, a detailed description of the preferred embodiment is provided. FIG. 1 provides an illustration of the hardware involved in decimal division. FIG. 2 provides an illustration of the improvement provided by the present invention which in conjunction with the hardware in FIG. 1 reduces the number of cycles necessary for decimal division. The algorithm by which decimal division is accomplished using the system shown in FIGS. 1 and 2 is provided in FIG. 3. FIG. 4 illustrates a state diagram for control of the mechanism shown in FIGS. 1 and 2.

System Overview

The major functional components of the apparatus shown in FIG. 1 include a decimal adder 11, a digit shifter 12, a first register 13 designated the AR register, a second register 14 designated the RR register, and a third register 15 designated the MQR register.

The decimal adder 11 operates to add the contents of the AR register 13 to the contents of the RR register 14 and to load the results back to either the RR register 14 or the AR register 13. The AR register 13 is supplied up to 16 4-bit digits making bits 0:63 across lines 16. Lines 16 are supplied from a multiplexer 17 which is controlled to select one of five inputs by a controller 18. The controller 18 output on line 19 is determined by an input designated AR.Control on line 20 and an input designated AR.Div.Hold on line 21. The five inputs to the multiplexer 17 include the output of the AR register from line 22, the output from the decimal adder from line 23, the SR.Read bus bits 0:63 (see FIG. 2) on line 24, all the zeros from line 25 or the high output of the shifter 12 from line 26. The output of the AR register 13 on line 22 is supplied to a multiplexer 27, an AR=0 and overflow detector 28, a 9's complement generator 29, a parity checker 30 and sign bit logic 31. The 9's complement generator 29 supplies a 9's complement of the contents of the AR register on line 32 as the other input to the multiplexer 27. In order to perform a subtraction, a complement signal is supplied on line 33 to cause the multiplexer 27 to select a 9's complement output from line 32. The of the multiplexer on line 34 is supplied as one input to the decimal adder 11. Thus, the input from line 34 to the decimal adder 11 is either the contents of the AR register 13 from line 22 or the 9's complement of the contents of the AR register from line 32. The output of the result register 14 is supplied on line 35 as the other input to the decimal adder 11.

When doing 9's complement addition to perform subtraction, the decimal adder 11 behaves as a means for determining whether the operand in the RR register 14 is less than the operand in the AR register 13, a situation that results in an unsuccessful subtraction. The carryout signal on line 44 is asserted for all successful subtractions done by 9's complement addition and is not asserted for unsuccessful ones.

The input to the RR register 14 is normally the output from line 23 of the decimal adder. It can also include the SR.read bus 24, all zeros on line 36, the high output of the digit shifter 12 from line 26, or it can be fed back on line 35 from its output. The bits 60:63 which correspond to the sign digit can be supplied directly from the sign bit logic 31 across line 37. The output 35 of the result register 14 is in addition connected to a parity checker 38, an input-output pin 39 for transmission to other parts of the machine, an invalid digit detector 40, a leading zero digit counter 41 and to the sign bit logic 31.

The decimal adder 11 includes parity prediction circuitry 42 for predicting the parity of the result supplied on line 23. In addition, a carry trigger signal on line 43 is supplied to the decimal adder and the carry out signal is generated on line 44 which goes true when the result from line 23 overflows.

As already mentioned, the digit shifter 12 includes a shift high output 26. In addition, the digit shifter 12 includes a shift low output on line 45 which is supplied to the MQR register 15. The digit shifter 12 is 128 bits wide including a high portion including bits 0:63 and a low portion including bits 64:127. The low portion is loaded across line 46 with the contents of the MQR register 15. The digit shifter 12 is able to shift either left or right in response to a shift amount signal on line 47.

The shift amount signal on line 47 is supplied from an SAR register 48. The SAR register 48 is loaded by shift amount logic 49. Shift amount logic 49 is controlled by the RR leading zero digit count on line 50 which is generated by the leading zero digit count logic 41. In addition, an input from a loop count register 51 is supplied to the shift amount logic 49 on line 52. Further, the instruction unit of the processor supplies a signal indicating the length of the second operand on line 53. In addition, the output on line 47 of the SAR register 48 is supplied to the shift amount logic 49.

The loop count register 51 is loaded by loop count logic 54. Input to the loop count logic 54 includes the first operand length on line 55, second operand length on line 53, the RR.leading zero digit count on line 50, the carry out signal on line 44 from the decimal adder, an all zero signal on line 56 and the loop count from line 52.

The digit shifter 12 also includes a shift overflow output on line 57.

Bits 56:59 of the MQR register 15 can be loaded from a QL latch across line 58. The QL latch is shown in FIG. 2.

In addition, the output of the MQR register 15 is connected to a parity checker 59.

FIG. 2 illustrates the SR.read bus from line 24, the AR dividend hold signal from line 21 and the QL signal on line 58. The operands for the performing of the division according to the present invention are supplied through an operand word register 101 across line 102 to multiplexer 103 for supply across line 24 on the SR.read bus to the AR register 13 and the RR register 14. The multiplexer 103 also receives as inputs the contents of scratch registers SR0, SR1, SR2, SR3 across lines 104–107, respectively. There are four scratch registers in the embodiment shown. However, the user can include up to nine scratch registers for decimal divide, if desired. The scratch registers are loaded through multiplexer 108 with data from the operand word register across line 102 or from the RR register 14 across line 35. The multiplexer 108 is controlled by controller 109 in response to the SR.write bus control on line 110 and the SR.write address on line 111. The output of the RR register from line 35 is used during the initialization of the scratch registers SR0–SR3, as discussed below The scratch registers SR0–SR3, in combination with the multiplexer 103 and the SR.read bus on line 24 make up a means generally designated by 112 for supplying a plurality of multiples of the divisor digit to the SR.read bus on line 24.

The section of the system shown in FIG. 2 generally designated by 113 comprises a means for predicting the minimum possible quotient digit in response to the leading two digits of the partial remainder and the leading digit of the divisor.

During initialization, the divisor is clocked through the RR register 14 as described below. Bits 4:7 of the RR register 14 are supplied on line 114 to multiplexer 115 when the divisor is aligned in the result register 14 with its leading significant digit in bit positions 4:7. The output of the multiplexer 115 on line 116 is supplied to a register 117, designated the DL register, for storing the leading significant divisor digit. The output of the DL register 117 is supplied on line 118 as an input to a divide table lookup logic 119. In addition, it is fed back as a second input to the multiplexer 115.

The dividend, during initialization, and following partial remainders, during division, are aligned in the RR register 14 so that the two leading significant digits reside in bit positions 4:11. Thus, bit positions 4:11 of the RR register are supplied on lines 120 as a second input to the divide table lookup logic 119. The divide table lookup logic 119 in response to the leading significant divisor digit and the two leading significant partial remainder digits from lines 118 and 120, respectively, generates the predicted minimum possible quotient digit on line 121 which is supplied to multiplexer 122. The output of the multiplexer 122 on line 123 is supplied to a QL register 124. The output of the QL register 124 is supplied on line 58 as the signal QL. In addition, the signal QL on line 58 is fed back as an input to a +1 incrementer 125. The output of the incrementer 125 is supplied on line 126 as a second input to the multiplexer 122. Further, the QL signal on line 58 is supplied as a third input to the divide table lookup logic 119 for error checking purpose and of a generation of the divider select line 127.

In addition, the divide table lookup logic 19 generates the AR divide hold signal on line 21 and a divide select signal on line 127. The divide select signal on line 127 is supplied as one input to a controller 128 that controls the multiplexer 103. The second input to the controller 128 is the SR.read address on line 129.

Further, the output on line 58 of the QL register 124 is supplied to a parity checker 130. Within the divide table lookup logic is a parity prediction circuitry 131.

In operation, operands enter the decimal unit shown in FIGS. 1 and 2 through the operand word register 101. The scratch registers SR0, SR1, SR2 and SR3 are available for storing data temporarily. The AR register 13 and the RR register 14 hold data that can be added together by the decimal adder 11 with the result saved in either the AR register 13 or the RR register 14. The RR register 14 and the MQR register 15 hold data that can be shifted with the output returned to them. The results are stored in the RR register 14. All of these registers are 64 bits wide and therefore can accommodate 16 decimal digits where each decimal digit occupies 4 bits. Decimal adder 11 is also 64 bits wide and therefore can accommodate the entire divisor as one of its operands. The loop count register 51 contains a loop count that can be used to control iterative operations, such as iterative generation of quotient digits during decimal division. The loop count in the loop count register 51 can be decremented conditionally if there is no carry out across line 44 from the decimal adder 11. The SAR register 48 contains a shift amount in digits to control the shifter. The SAR register can be loaded conditionally with a left 1 or left 16 depending on the loop count in the loop count register 51. The divide table lookup logic 119 obtains a leading non-zero divisor digit from the DL register 117. QL register 124 accumulates a current predicted quotient digit. After the quotient digit is computed, it is copied into bits 56:59 of the MQR register 15 across line 58 and then shifted left along the MQR register 15 as other quotient digits are computed. The divide table lookup logic 119 selects data onto the SR.read bus 24 from the scratch registers SR0:SR3, which during a decimal division have been preloaded with various multiples of the divisor.

Execution of Decimal Divide

There are three major steps involved in performing a decimal division according to the present invention. First, the dividend and divisor operands are received and steps are taken to set up for the iterative part of the division algorithm. The multiples of the divisor are computed and stored into the scratch registers. In the embodiment including 4 scratch registers, 2×divisor is stored in SR1, 3×divisor is stored in SR2 and 6×divisor is stored in SR3. The leading non-zero divisor digit is loaded into the DL register 117. The number of quotient digits less one to be calculated for the result is loaded into the loop count register 51. The dividend is loaded into the RR register 14 and extended into the MQR register 15 if it is longer than 64 bits including the sign digit. That part of the MQR register 15 that is to the right of the dividend is loaded with zeros. A copy of 1×divisor is placed in the AR register 13 and scratch register SR0.

After initialization, the decimal adder 11 and the divide table lookup logic 119 are used to compute the quotient, one digit at a time. The loop count register 51 is decremented each time a quotient digit is found. When the loop count register 51 contains zero, the final quotient digit has been computed.

After all quotient digits have been found, the result, including the quotient, the remainder and the signs thereof, is placed in the RR register 14 and then stored.

Quotient Digit Computation Using the Divide Table Lookup Logic

According to the present invention, the subtraction process is improved by use of the divide table lookup logic. The divide table lookup logic predicts the least possible quotient digit (LPQ) by comparing the leading divisor digit (LDD) against the two leading partial remainder digits (LPR). The prediction is made by assuming that the divisor consists of the leading divisor digit LDD concatenated with all 9's and the partial remainder consists of two leading partial remainder digit LPR concatenated with all zeros. In this event, the least possible quotient digit LPQ can be calculated according to Equation 1.

$$LPQ = INT(LPR/(LDD+1)) \qquad \text{Equation 1}$$

In the preferred embodiment, this prediction of the least possible quotient digit LPQ is provided by the table lookup mechanism which stores a table such as shown in Table 1.

The prediction of the least possible quotient digit is performed so that the product of the least possible quotient digit LPQ times the divisor is always less than the partial remainder. Therefore, it is guaranteed that the subtraction of the least possible quotient digit times the divisor from the partial remainder will yield a valid result, resulting in a carry out signal on line 44 (9's complement addition is used to accomplish the subtraction, and for every non-negative result, a carry out signal will be generated). The divide table lookup logic 119 generates a divide select signal on lines 127, causing the multiplexer 103 to select a multiple of the divisor from the scratch registers that is closest to without exceeding the least possible quotient digit predicted by the table lookup. The selected multiple is supplied over the SR.read bus and subtracted from the partial remainder. Thus with the embodiment shown, if the least possible quotient digit is 1, 2, 3 or 6, scratch registers SR0, SR1, SR2 or SR3, respectively, are selected. If the least possible quotient digit is 4 or 5, scratch register SR2 is selected containing three times the divisor digit. If the least possible quotient digit is 7, 8 or 9, scratch register SR3 is selected so that six times the divisor is subtracted from the partial remainder.

In the embodiment shown, where there are four scratch registers for a base 10 subtraction, a second subtraction of a multiple of the divisor can be used to enhance the performance. Thus, when the least possible quotient digit is 4 or 5, after three times the divisor is subtracted from the partial remainder, the divide table lookup logic 119 selects a scratch register so that the least possible quotient digit minus 3 times the divisor is subtracted from the partial remainder. If the least possible quotient digit is 7, 8 or 9, then after six times the divisor is subtracted, the divide table lookup logic 119 selects a scratch register so that the least possible quotient digit minus 6 times the divisor is subtracted from the partial remainder. Therefore, the initial subtraction takes two cycles if the least possible quotient digit is 4, 5, 7, 8 or 9 for the embodiment disclosed. In following cycles, 1 times the divisor is subtracted from the partial remainder until a carryout signal is generated, as described above. During each cycle of the division loop, the divide table lookup logic 119 selects the proper multiple of the divisor into the AR register to be subtracted from the partial remainder in the following cycle.

The QL register 124 is used to tally the number of successful subtractions. When the first unsuccessful subtraction occurs, the QL latch 124 holds a correct quotient digit. Then three actions are taken. First the QL latch 124 is preserved by shifting it into the MQR

TABLE 2

| LPQ(*) | Decimal Divide Table Lookup Data INPUT | | | | | | | | |
|---|---|---|---|---|---|---|---|---|---|
| 0 | 100–101 | 200–202 | 300–303 | 400–404 | 500–505 | 600–606 | 700–707 | 800–808 | 900–909 |
| 1 | 102–103 | 203–205 | 304–307 | 405–409 | 506–511 | 607–613 | 708–715 | 809–817 | 910–919 |
| 2 | 104–105 | 206–208 | 308–311 | 410–414 | 512–517 | 614–620 | 716–723 | 818–826 | 920–929 |
| 3 | 106–107 | 209–211 | 312–315 | 415–419 | 518–523 | 621–627 | 724–731 | 827–835 | 930–939 |
| 4 | 108–109 | 212–214 | 316–319 | 420–424 | 524–529 | 628–634 | 732–739 | 836–844 | 940–949 |
| 5 | 110–111 | 215–217 | 320–323 | 425–429 | 530–535 | 635–641 | 740–747 | 845–853 | 950–959 |
| 6 | 112–113 | 218–220 | 324–327 | 430–434 | 536–541 | 642–648 | 748–755 | 854–862 | 960–969 |
| 7 | 114–115 | 221–223 | 328–331 | 435–439 | 542–547 | 649–655 | 756–763 | 863–871 | 970–979 |
| 8 | 116–117 | 224–226 | 332–335 | 440–444 | 548–553 | 656–662 | 764–771 | 872–880 | 980–989 |
| 9 | 118–119 | 227–229 | 336–339 | 445–449 | 554–559 | 663–669 | 772–779 | 881–889 | 990–999 |

Note:
*LPQ: lowest possible quotient digit.
**Format for input table is VNN–VNN, indicating a range where:
V = Leading divisor digit (Latched by Divisor Latch)
NN = Result Register digits 1:2. (These will become digits 0:1 of the dividend/remainder after the 'left shift by 1' operation.)

register 15, as discussed above. Second, the QL register 124 is reset. Last, the partial remainder in the RR register 14 and the partial quotient in the MQR register 15 are shifted left by one, discarding digit 0 of the partial remainder and making room in the MQR register 15 for the next quotient digit. The algorithm is repeated until all quotient digits have been found, a condition that is indicated when the loop count register 51 contains 0.

Detailed Flow Chart

Figure 3:
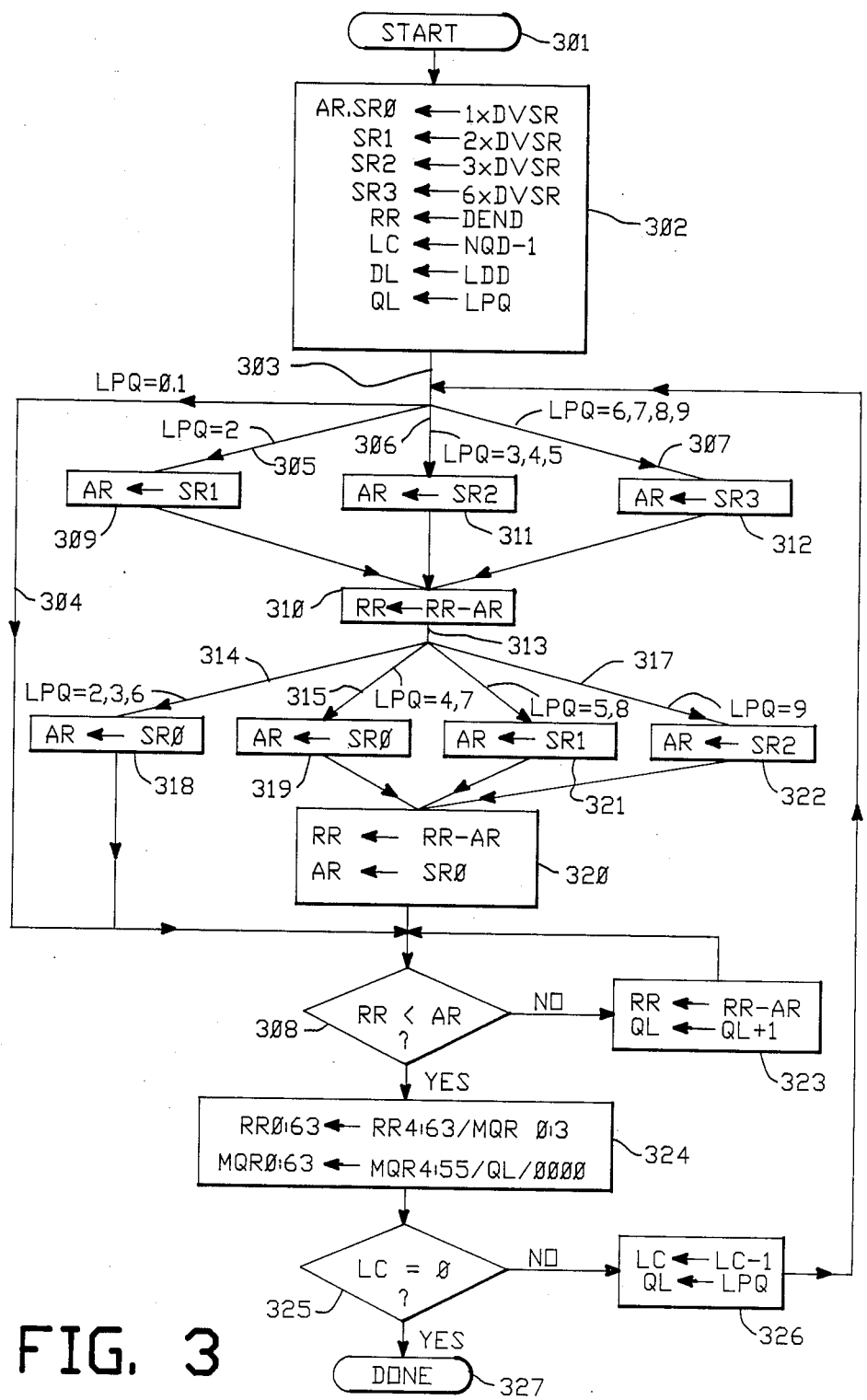
FIG. 3 is a flow chart illustrating the algorithm according to the present invention.
Figure 4:
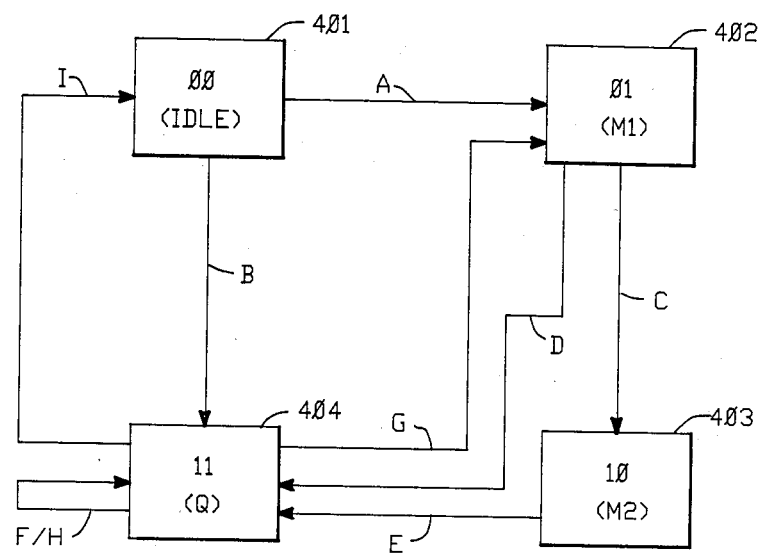
FIG. 4 is a state diagram for describing the operation of the divide table lookup mechanism.

FIG. 3 illustrates a flow chart for calculation of each quotient digit using the mechanism described with reference to FIGS. 1 and 2. The algorithm is started (block 301) with a signal from the host processing system to perform a decimal divide. The divide mechanism is initialized (block 302) by setting the AR register 13 and scratch register SR0 to 1 times the divisor; setting scratch register SR1 to 2 times the divisor; setting scratch register SR2 to 3 times the divisor; setting scratch register SR3 to 6 times the divisor; storing the dividend in the RR register 14; setting the loop count to the number of quotient digits to be calculated minus one; setting the divisor latch 117 to the leading divisor digit and setting the QL latch 124 to the least possible quotient digit as determined by the divide table lookup logic 119.

The flow chart branches at point 303 depending upon the value of the least possible quotient digit. If the least possible quotient digit is 0 or 1, line 304 is followed. If the least possible quotient digit is equal to 2, line 305 is followed If the least possible quotient digit is equal to 3, 4 or 5, line 306 is followed. And finally, if the least possible quotient digit is 6, 7, 8 or 9, line 307 is followed.

For a least possible quotient digit 0 or 1, the next step along line 304 is to determine whether the leading digits of the dividend in the result register are less than the divisor stored in AR register 13 (block 308). This step (block 308) is reached along the other possible paths 305, 306 and 307, as follows.

Along path 305 where the least possible quotient digit is equal to 2, the AR register 13 is set equal to 2 times the divisor from scratch register SRI (block 309). Then the partial remainder portion of the RR register 14 is set equal to the partial remainder minus 2 times the divisor from AR register 13 (block 310).

If the least possible quotient digit is 3, 4 or 5 along path 306, the AR register 13 is loaded with 3 times the divisor from scratch register SR2 (block 311). Then the partial remainder is updated by subtracting the value stored in the AR register 13 from the value of the partial remainder in the RR register 14 (block 310). If the least possible quotient digit is 6, 7, 8 or 9 along path 307, then the AR register is loaded with 6 times the divisor from scratch register SR3 (block 312). Then the partial remainder is updated by subtracting 6 times the divisor from the partial remainder stored in RR register 14 (block 310).

The flow chart takes a second branch at point 313 depending on the value of the least possible quotient digit. If the least possible quotient digit is 2, 3 or 6, the branch follows path 314. If the least possible quotient digit is 4 or 7, the branch follows path 315. If the least possible quotient digit is 5 or 8, the branch follows path 316. If the least possible quotient digit is 9, the branch follows path 317.

The branch 313 follows path 314 if the least possible quotient digit is 2, 3 or 6, corresponding to the value of the multiple stored in scratch registers SR1, SR2 and SR3, respectively. Along this path 314, the AR register 13 is set equal to 1 times the divisor from scratch register SR0 (block 318). Then the algorithm goes to block 308 where the value of the partial remainder in the RR register 14 is compared with the value stored in the AR register which is 1 times the divisor.

If the least possible quotient digit is 4 or 7, the branch 313 follows path 315 to block 319 where the AR register is set to 1 times the divisor from scratch register SR0 (block 319). Then, the partial remainder in the RR register 14 is updated by subtracting the value of 1 times the divisor stored in the AR register 13 and the AR register is set to 1 times the divisor (block 320).

If the least possible quotient digit is 5 or 8, the AR register is loaded with 2 times the divisor from scratch register SR1 (block 321). Then the partial remainder in the RR register 14 is updated by subtracting 2 times the divisor and the AR register is loaded with 1 times the divisor (block 320).

If the least possible quotient digit is 9, along path 317, then the AR register is loaded with 3 times the divisor from scratch register SR2 (block 322). Then the partial remainder in the RR register 14 is updated by subtracting 3 times the divisor and the AR register is set to 1 times the divisor from scratch register SR0 (block 320). The output of block 320 is supplied to the block 308 where it is determined whether the partial remainder in the result register is less than the value of the divisor. In the embodiment shown in FIGS. 1 and 2, this is determined by subtracting the divisor which is loaded into the AR register 13 from the partial remainder in the RR register 14. If the divisor is greater than the partial remainder, there will be no carryout signal on line 44 when 9's complement addition is used for the subtraction. If it is less than or equal to the partial remainder, there will be a true carryout signal on line 44.

The next step in the flow chart occurs if the partial remainder is not less than the divisor. In this case, the partial remainder is updated by subtracting 1 times the divisor from the partial remainder and the quotient latch 124 is incremented by the incrementing means 125 (block 323). The flow then returns to block 308 where it is once again determined whether it is less than the divisor.

If the partial remainder is less than the divisor, the RR register bits 0:63 are shifted left by one digit resulting in a concatenation of RR digits 4:6 with digits 0:3 from the MQR register 15. In addition, the value of the quotient latch 124 is shifted into the MQR register, resulting in a concatenation of MQR bits 4:55 with the value of the quotient latch in bits 56:59 and four zeros in bits 60:63 (block 324). Next, the value in the loop count register 51 is checked to determine whether it is equal to zero (block 325). If it is not equal to zero, additional quotient digits must be calculated. The loop count register is decremented and the quotient latch is loaded with a predicted least possible quotient digit by the divide table lookup logic 119, using as inputs the leading two digits of the partial remainder from the RR register 14 as updated in block 324 and the leading digit of the divisor (block 326). Then the loop is returned to the branch point 303 and repeated.

If the loop count is equal to zero, the division is complete (block 327).

Division Control State Machine

In the implementation of the flow chart of FIG. 3, a 4-state state machine is used to control the division as shown in FIG. 4. The states include Idle 401, M1 402, M2 403 and Q 404.

In the Idle state 401, the state machine waits for a microcode to set up the division. The divide start signal DS is asserted to start the division. When DS=1, the following conditions are true:

1. The leading divisor digit and the leading partial remainder digits are correct for the first iteration, so the least possible quotient digit supplied by the table lookup is valid.

2. The dividend, left justified, is stored in the RR register 14.

3. The divisor is stored in the AR register 13 with only one leading zero digit.

In the M1 state, one of the multiples of the divisor is set up to be subtracted from the partial remainder.

In the M2 state, for those least possible quotient digits that require the subtraction of two multiples of the divisor, the division system is set up to subtract this second multiple.

In the Q state, the subtraction occurs and the value of the partial remainder is compared to the value of the divisor and the registers are set up for the calculation of following quotient digits, if any.

The transfer equations labeled by lines A, B, C, D, E, F, G, H and I set out below with the function performed in each of the states after the associated transfer equation in the righthand column.

(A) DS = 1 & LPQ ne ∅

LPQ⟶QL, SRn⟶AR, SL(RR)⟶RR (B) DS = 1 & LPQ eq ∅

LPQ⟶QL, AR⟶AR, SL(RR)⟶RR (C) LPQ = 4,5,7,8,9

RR−AR⟶RR, SRn⟶AR (D) LPQ ne 4,5,7,8,9

RR−AR⟶RR, SR∅⟶AR (E) State = M2

RR−AR⟶RR, SR∅⟶AR (F) Carry out

RR−AR⟶RR, QL + 1⟶QL (G) $\overline{\text{Carry out}}$ & LC ne ∅ & LPQ ne ∅

SL(RR)⟶RR, LC − 1⟶LC
QL⟶MQR, LPQ⟶QL (H) $\overline{\text{Carry out}}$ & LC ne ∅ & LPQ eq ∅

SL(RR)⟶RR, LC − 1⟶LC
QL⟶MQR, LPQ⟶QL (I) LC = ∅ & $\overline{\text{Carry out}}$

Error Checking for Divide Table Lookup

As illustrated in FIG. 1, the divide table lookup logic 119 includes parity prediction circuitry 131 for detecting errors in the quotient latch 124.

An even parity bit of the least possible quotient digit LPQ, latched in the M1 state, is predicted by including a lookup table that mirrors the table for looking up the least possible quotient digit. The even parity bit will be high if the least possible quotient digit is 1, 2, 4, 7 or 8.

If an M2 state where the quotient latch is not changed occurs, the parity bit is held accordingly.

If in following Q states, while the incrementer 125 increases the value of the quotient latch 124 by one until the final quotient digit is formed, the QL parity bit is toggled accordingly. An exception occurs when the incrementer 121 attempts to change the value of the QL latch from 9 to A (hex), then a bad parity bit is forced to flag the error condition.

In the following cycle, this predicted parity bit is compared against the generated parity of the quotient latch 124 in the parity checker 130. An error is sent to error reporting logic if a mismatch occurs.

Further error checking occurs in the divide table lookup logic 119 during transfer equations (A), (B), (G), or (H) by checking scratch register controls provided over lines 127. The logic compares the value of the least possible quotient digit against the control lines if the least possible quotient digit is 2, 4, 7 or 8 to make certain that correct lines have been asserted. This error is generated according to the following Equation 2 where Sel SCRx indicates selection signal for SCRx, LPQ is the predicted quotient digit and the selection signals are asserted when low as indicated by a bar over the symbol.

ERROR =                 Equation 2

(LPQ = 2)&(Sel SCR∅ + $\overline{\text{Sel SCR1}}$ + Sel SCR2 + Sel SCR3) +

(LPQ = 4)&(Sel SCR∅ + Sel SCR1 + $\overline{\text{Sel SCR2}}$ + Sel SCR3) +

(LPQ = 7,8)&(Sel SCR∅ + Sel SCR1 + Sel SCR2 + $\overline{\text{Sel SCR3}}$)

Conclusion

As described above, the present invention uses a table implemented in hardware to determine the minimum possible quotient digit based upon the leading decimal divisor digit and the two leading current partial remainder digits. The multiple of the divisor specified by the minimum quotient digit is subtracted from the current remainder and then the iterative process closing on the quotient digit begins. The initial subtraction takes one or two cycles, depending upon which multiple of the divisor must be subtracted and what multiples of the divisor are maintained in the scratch registers.

According to this invention, a savings of approximately two and a half cycles per quotient digit is achieved compared to the classical method of decimal division.

It should be appreciated that the present invention can be adapted to improve the division of numbers in any base over 2. The number of cycles saved per digit is improved for numbers in higher bases. The most immediate value of the invention, however, resides in its use as a decimal divider.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. The embodiment was chosen and described in order to best explain the principles of the invention and its practical application, thereby enabling others skilled in the art to understand the invention for various embodiments and with various modifications as are suited to the particular use contemplated. It is intended that the scope of the invention be defined by the claims appended hereto and their equivalents.

We claim:

1. In a data processing machine for performing division in a base B greater than two of a divided having W digits by a divisor having X digits, where W is greater than X, to generate a quotient having Y digits, an apparatus for generating quotient digits $Q_i$, i=1 to Y, comprising:

first means for generating a set consisting of N multiples of the divisor, where N is fewer than B−1;

second means for generating an initial partial remainder $PR_i$ for the generation of a quotient digit $Q_i$;

means, responsive to one or more leading digit of the divisor and one or more leading digit of the partial remainder $PR_i$, for predicting a quotient digit for $Q_i$, the predicted quotient digit being a least possible quotient digit;

means, connected to the means for predicting and the first means for generating and responsive to the predicted quotient digit for $Q_i$, for selecting a first multiple of the set consisting of multiples of the divisor that is closed to without exceeding the predicted quotient digit times the divisor;

first means for subtracting the selected first multiple of the divisor from the partial remainder $PR_i$ to update the partial remainder $PR_i$;

means for determining whether the updated partial remainder $PR_i$ is less than the divisor;

quotient digit incrementing logic, connected to the means for determining and responsive to a determination that the updated partial remainder $PR_i$ is not less than the divisor, including means for subtracting one times the divisor from the updated partial remainder $PR_i$ to further update the partial remainder $PR_i$, means for incrementing the predicted quotient digit for $Q_i$, and means for returning the updated partial remainder $PR_i$ to the means for determining; and means, connected to the means for determining and responsive to a determination that the updated partial remainder $PR_i$ is less than the divisor, for storing the predicted quotient digit as $Q_i$.

2. The apparatus of claim 1, wherein the means for generating a set consisting of multiples of the divisor includes:

a plurality of multiple storing means for storing respective multiples of the divisor.

3. The apparatus of claim 1, wherein the means for predicting a quotient digit for $Q_i$ includes:

an addressable table storing means for storing a table of possible quotient digits addressed in response to the one or more leading digit of the divisor and the one or more leading digit of the partial remainder $PR_i$.

4. The apparatus of claim 1, wherein the means for predicting a quotient digit for $Q_i$ includes: means for receiving the one leading digit LDD of the divisor and the two leading digits LPR of the partial remainder $PR_i$; and means for generating the predicted quotient digit according to the following equation:

$Q_i$ = the integer (LPR/(LDD+1)).

5. The apparatus of claim 4, wherein the means for predicting a quotient digit for $Q_i$ includes addressable table storing means for storing a table of possible quotient digits addressed by the one leading divisor digit and the two leading partial remainder digits.

6. The apparatus of claim 1, wherein the base is 10.

7. The apparatus of claim 1 wherein the means for storing the predicted quotient digit as $Q_i$ further includes:

means, responsive to the storing of the final quotient digit $Q_Y$ for storing the updated partial remainder $PR_Y$ that is determined to be less than the divisor as a remainder of the division.

8. The apparatus of claim 1, further including means responsive to the prediction of a quotient digit for $Q_i$ for predicting an error code for the predicted quotient digit for $Q_i$.

9. In a data processing machine for performing division in a base B greater than two of a dividend having W digits by a divisor having X digits, where W is greater than X, to generate a quotient having Y digits, an apparatus for generating quotient digits $Q_i$, i=1 to Y, comprising:

first means for generating a set consisting of N multiples of the divisor, where N is fewer than B−1;

second means for generating an initial partial remainder $PR_i$ for the generation of a quotient digit $Q_i$;

means, responsive to one or more leading digit of the divisor and one or more leading digit of the partial remainder $PR_i$, for predicting a quotient digit for $Q_i$;

means, connected to the means for predicting and the first means for generating and responsive to the predicted quotient digit for $Q_i$, for selecting a first multiple of the set consisting of multiples of the divisor that is closest to without exceeding the predicted quotient digit times the divisor;

means connected to said means for selecting a first multiple, for selecting a second multiple of the set consisting of multiples of the divisor if the predicted quotient digit times the divisor is greater than the first multiple;

first means for subtracting the selected first multiple of the divisor from the partial remainder $PR_i$ to update the partial remainder $Pr_i$;

second means for subtracting the selected second multiple of the divisor from the partial remainder $PR_i$ to further update the partial remainder $PR_i$, if a second multiple is selected;

means for determining whether the updated partial remainder $PR_i$ is less than the divisor;

quotient digit incrementing logic, connected to the means for determining and responsive to a determination that the updated partial remainder $PR_i$ is not less than the divisor, including means for subtracting one times the divisor from the updated partial remainder $PR_i$, to further update the partial remainder $PR_i$, means for incrementing the predicted quotient digit for $Q_i$, and means for returning the updated partial remainder $PR_i$ to the means for determining; and means, connected to the means for determining and responsive to a determination that the updated partial remainder $PR_i$ is less than the divisor, for storing the predicted quotient digit as $Q_i$.

10. The apparatus of claim 9, wherein the means for generating a set consisting of multiples of the divisor includes:
   a plurality of multiple storing means for storing respective multiples of the divisor.

11. The apparatus of claim 10, wherein the base is 10, and the respective multiples include one times the divisor, two times the divisor, three times the divisor and six times the divisor.

12. The apparatus of claim 9, wherein the means for predicting a quotient digit for $Q_i$ includes:
   an addressable table storing means for storing a table of possible quotient digits addressed in response to the one or more leading digit of the divisor and the one or more leading digit of the partial remainder $PR_i$.

13. The apparatus of claim 9, wherein the means for predicting a quotient digit for $Q_i$ includes:
   means for receiving the one leading digit LDD of the divisor and the two leading digits LPR of the partial remainder $PR_i$; and
   means for generating the predicted quotient digit according to the following equation:

$Q_i$ = the integer (LPR/(LDD+1)).

14. The apparatus of claim 9, wherein the
   means for predicting a quotient digit for $Q_i$ includes addressable table storing means for storing a table of possible quotient digits addressed by the one leading divisor digit and the two leading partial remainder digits.

15. The apparatus of claim 9, wherein the base is 10.

16. The apparatus of claim 9 wherein the means for storing the predicted quotient digit as $Q_i$ further includes:
   means, responsive to the storing of the final quotient digit $Q_Y$ for storing the updated partial remainder $PR_Y$ that is determined to be less than the divisor as a remainder of the division.

17. The apparatus of claim 9, further including means responsive to the prediction of a quotient digit for $Q_i$ for predicting an error code for the predicted quotient digit for $Q_i$.

18. A method for performing division in a data processing machine in a base B greater than 2 of a dividend having W digits by a divisor having X digits, where W is greater than X, to generate a quotient having Y digits, the data processing machine comprising an array of storage locations and an arithmetic unit with a result storage location operable under control of data process machine programs, comprising the steps for generating the quotient digits $Q_i$ for i=1 to Y, of:
   storing in the array of storage locations, a set consisting of N multiples of the divisor, where N is fewer than B−1;
   generating in the data processing machine an initial partial remainder $PR_i$ for the generation of quotient digit $Q_i$;
   predicting in the data processing machine the quotient digit for $Q_i$ in response to one or more leading digit of the divisor and one or more leading digit of the partial remainder $PR_i$, the predicted quotient digit being a least possible quotient digit;
   selecting in the data processing machine a first multiple of the set consisting of multiples of the divisor that is closest to without exceeding the predicted quotient digit times the divisor;
   subtracting in the arithmetic unit the selected first multiple of the divisor from the partial reminder $PR_i$ to update the partial remainder $PR_i$;
   determining in the data processing machine whether the updated partial remainder $PR_i$ is less than the divisor; and
   if the updated partial remainder $PR_i$ is not less than the divisor, then under control of the data processor machine subtracting in the arithmetic unit 1 times the divisor form the updated partial remainder $PR_i$ to further update the partial remainder $PR_i$, incrementing in the arithmetic unit the predicted quotient digit for $Q_i$, and returning the updated partial remainder $PR_i$ to the step of determining whether the updated partial remainder $PR_i$ is less than the divisor, and if the updated partial remainder is less than the divisor, then under control of the data processing machine storing in the result storage location the predicted quotient digit as $Q_i$.

19. The method of claim 18, wherein the step of predicting a quotient digit for $Q_i$ includes the step of:
   storing a table of possible quotient digits addressed in response to the one or more leading digit of the divisor and the one or more leading digit of the partial remainder $PR_i$.

20. The method of claim 18, wherein the step of predicting a quotient digit for $Q_i$ includes the step of:
   receiving the one leading digit LDD of the divisor and the two leading digits LPR of the partial remainder $PR_i$; and
   generating the predicted quotient digit according to the following equation:

$Q_i$ = the integer (LPR/(LDD+1)).

21. The method of claim 18, wherein the step of predicting a quotient digit for $Q_i$ includes the step of:
   storing a table of possible quotient digits addressed by the one leading divisor digit and the two leading partial remainder digits.

22. The method of claim 18, wherein the base is 10.

23. The method of claim 18 further including after the storing of the final quotient digit $Q_Y$ the step of:
   storing the updated partial remainder $PR_Y$ that is determined to be less than the divisor as a remainder of the division.

24. The method of claim 18, further including after the step of selecting a first multiple of the divisor, the steps of:
   selecting a second multiple of the set consisting multiples of the divisor if the predicted quotient digit times the divisor is greater than the first multiple; and
   subtracting the selected second multiple of the divisor from the partial remainder $PR_i$ to further update the partial remainder $PR_i$, if a second multiple is selected.

25. The method of claim 24, wherein the base is 10 and the set consisting of multiples includes one times the divisor, two times the divisor, three times the divisor and six times the divisor.

* * * * *